United States Patent [19]

Tah-Sun

[11] 4,181,376
[45] Jan. 1, 1980

[54] ROLLING TYPE DOOR OR WINDOW GUIDE

[76] Inventor: Lin Tah-Sun, 3rd Flr., 146, Chang-Chun Rd., Taipei, Taiwan

[21] Appl. No.: 919,783

[22] Filed: Jun. 28, 1978

[51] Int. Cl.² .............................................. F16C 29/04
[52] U.S. Cl. ...................................... 308/6 R; 308/3.8; 312/341 R
[58] Field of Search .................. 312/341 R; 308/3 R, 308/3.8, 3.6, 6 R; 16/87 B, 87.8

[56] References Cited

U.S. PATENT DOCUMENTS

| 3,362,357 | 1/1968 | Hoffert | 308/3.6 X |
| 3,716,284 | 2/1973 | Vogt | 308/3.6 X |

FOREIGN PATENT DOCUMENTS

| 122359 | 9/1946 | Australia | 308/3.8 |
| 548992 | 10/1959 | Canada | 308/3.8 |

*Primary Examiner*—Douglas C. Butler
*Attorney, Agent, or Firm*—Holman & Stern

[57] ABSTRACT

The invention provides a rolling-type door or window guide comprising opposed longitudinal track members attached to the door and frame, respectively, and a length-adjustable sliding assembly carrying rolling contact elements which is received between the respective track members.

5 Claims, 4 Drawing Figures

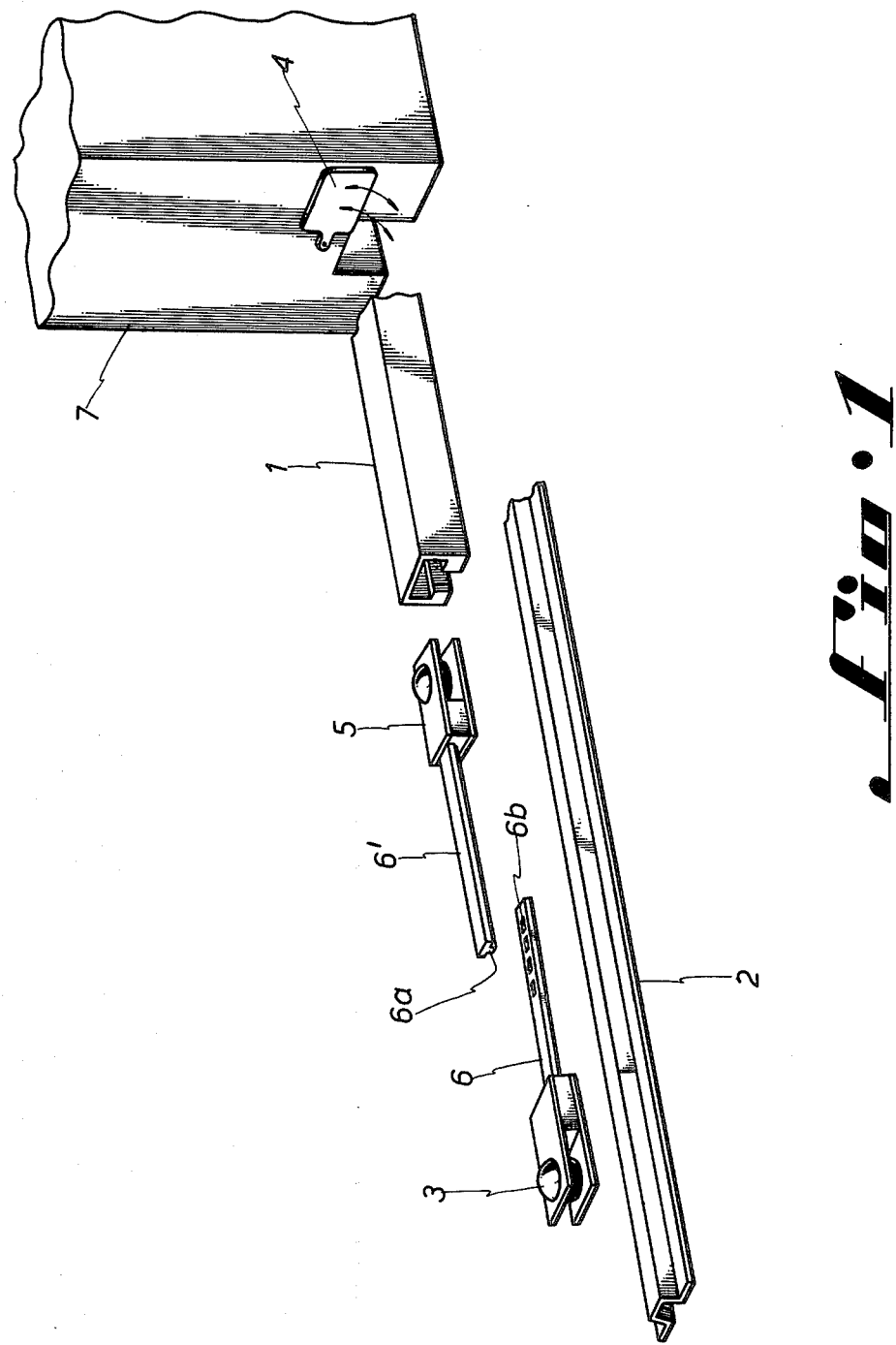

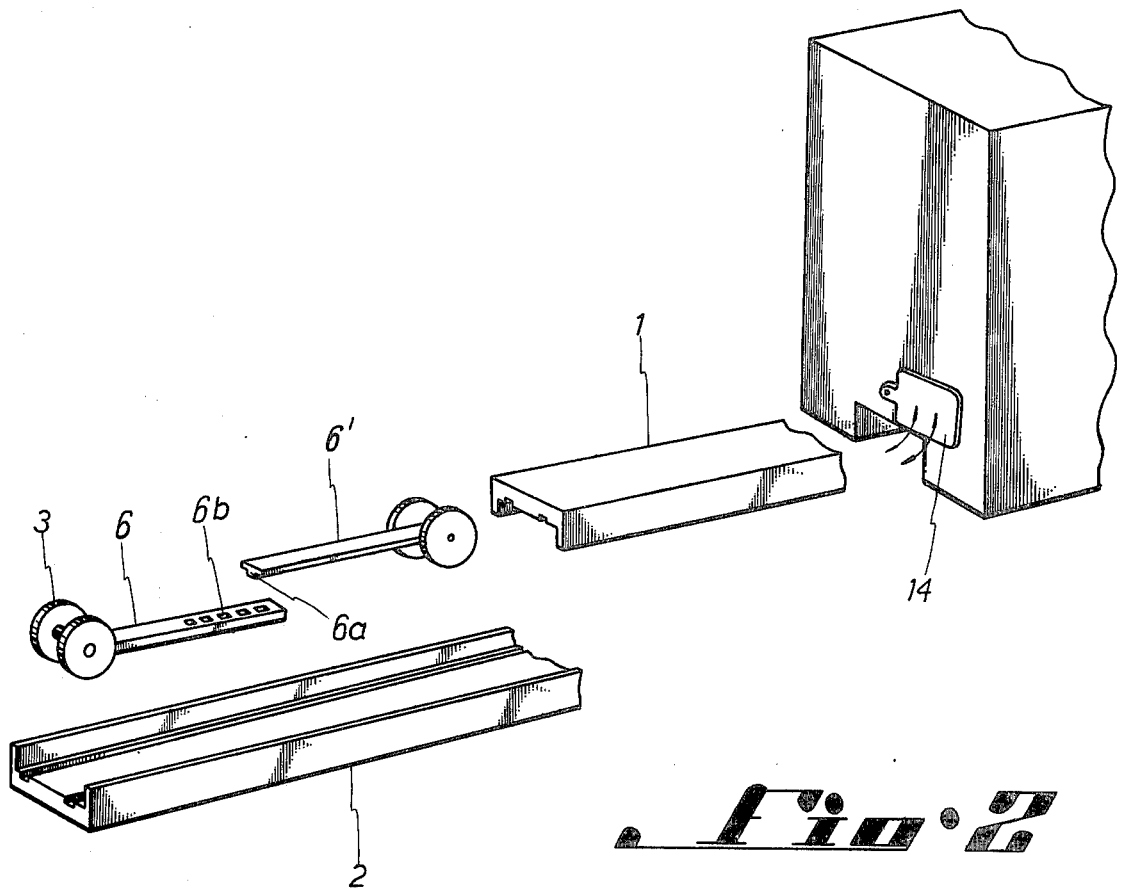
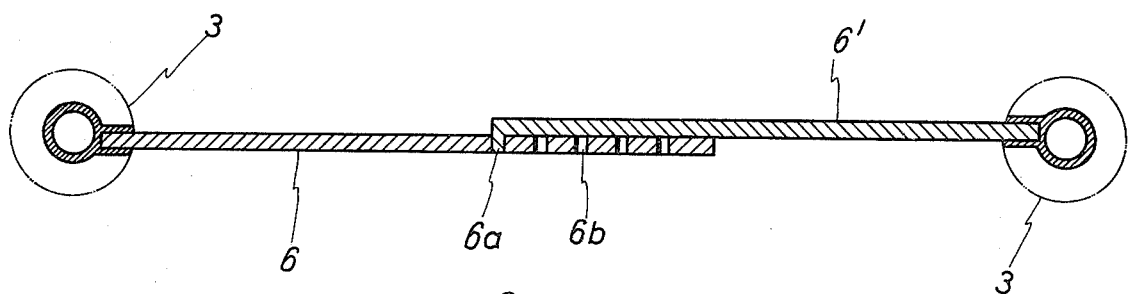
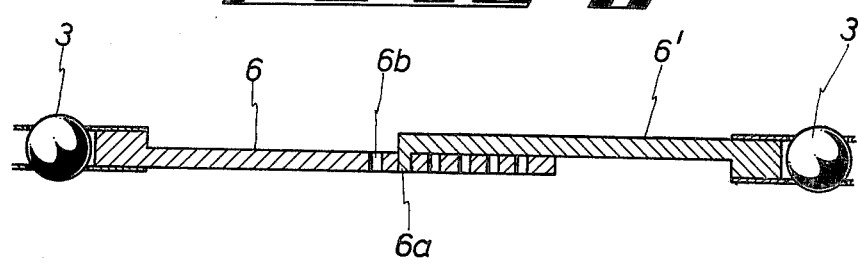

ROLLING TYPE DOOR OR WINDOW GUIDE

BRIEF SUMMARY OF THE INVENTION

An object of the present invention is to provide an energy-saving, noise-minimizing, and stabilizing sliding door or window guide. The door or window guide is made by locating a pair of balls or wheels which are secured on a length-adjustable rod means, between longitudinal track members carried by the door or window and a frame, respectively.

BRIEF DESCRIPTION OF THE DRAWINGS

FIG. 1 is an exploded respective view of one form of guide according to the invention;

FIG. 2 is an exploded respective view of another form of guide according to the invention;

FIG. 3 is a cross-sectional view of part of the guide shown in FIG. 2; and

FIG. 4 is a cross-sectional view of part of the guide shown in FIG. 1.

DESCRIPTION OF PREFERRED EMBODIMENTS

The invention provides an energy-saving noise-minimizing and stabilizing sliding door or window guide. Two steel balls or wheels are secured on opposite ends of a length-adjustable rod means. The rod means and balls or wheels constitute a sliding assembly which is received between track members secured to the door or window and a frame, respectively.

The track members are made of stainless steel or synthetic plastic and the rod means is made of plastic as well. Because of the hardness of steel balls the smooth surfaces of the balls and the track members, the door or window will be operated substantially noiseless.

As shown in FIGS. 1 and 4, a track member 1 of box-like cross section with a longitudinal opening in its lower wall is received in a groove in the edge of a door or window 7 while a complementary track member 2 is provided for attachment to the frame. A length-adjustable rolling assembly is received in the track member 1, this assembly comprising two similar rods 6, 6' with complementary attachment means 6a, 6b whereby the rods can be assembled to a length suited to the length of the door or window 7. The rods each have an end fitting 5 carrying a steel ball 3. The side walls of the track member 1 provide lateral confinement of the rolling assembly and longitudinal confinement within track member 1 is provided by pivotal plates 14 on the door or window 7. In use, the balls 3 roll on a post upper and lower surfaces of the track members 2 and 1, respectively.

A similar arrangement is shown in FIGS. 2 and 3 where like reference numerals are used to denote like parts. In this case, those track members are channel-shaped in cross section and longitudinal grooves are provided in their opposed bearing surfaces. The metal balls are replaced by wheels which run in the grooves.

I claim:

1. A rolling type guide for use between a pair of mutually slidable elements comprising a first elongated track member for attachment to one of said elements, a second elongated track member for attachment to the other of said elements, a rolling assembly receivable between said track members, said assembly comprising a pair of rods, each rod carrying a rolling contact element at one end of the respective rod and means for releasably connecting said rods together at a plurality of different locations lengthwise of the rods to adjust the length of the assembly, said rolling contact elements engaging opposed surfaces of the respective track members when received therebetween, means associated with said track members for laterally confining said rolling assembly and end constraints for longitudinally confining said rolling assembly within one of said track members.

2. The guide of claim 1 wherein each rod includes an end fitting carrying the respective rolling contact element.

3. The guide of claim 1 wherein one of said track members has a box-like cross-section with a longitudinal opening in one wall thereof.

4. The guide of claim 1 wherein said track members are channel-shaped.

5. The guide of claim 4 wherein opposed surfaces of said track members have longitudinal grooves and said rolling contact elements comprise wheels receivable in said grooves.